United States Patent
Uchida et al.

(10) Patent No.: US 6,855,178 B2
(45) Date of Patent: Feb. 15, 2005

(54) METHOD FOR PRODUCING FILM ELECTRODE JOINTED PRODUCT AND METHOD FOR PRODUCING SOLID POLYMER TYPE FUEL CELL

(75) Inventors: Makoto Uchida, Hirakata (JP); Junji Niikura, Hirakata (JP); Hisaaki Gyoten, Shijonawate (JP); Yasuo Takebe, Uji (JP); Kazuhito Hatoh, Osaka (JP); Masato Hosaka, Osaka (JP); Teruhisa Kanbara, Toyonaka (JP); Atsushi Mukoyama, Yokohama (JP); Hiroshi Shimoda, Yokohama (JP); Shinji Kinoshita, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 235 days.

(21) Appl. No.: 10/069,459

(22) PCT Filed: Jul. 5, 2001

(86) PCT No.: PCT/JP01/05864

§ 371 (c)(1),
(2), (4) Date: Feb. 26, 2002

(87) PCT Pub. No.: WO02/05371

PCT Pub. Date: Jan. 17, 2002

(65) Prior Publication Data

US 2002/0144394 A1 Oct. 10, 2002

(30) Foreign Application Priority Data

| Jul. 6, 2000 | (JP) | ............................. | 2000-204715 |
| Jul. 6, 2000 | (JP) | ............................. | 2000-204717 |
| Jan. 18, 2001 | (JP) | ............................. | 2001-010649 |

(51) Int. Cl.$^7$ ............................................. H01M 6/00

(52) U.S. Cl. ........................... 29/623.5; 429/30; 429/40; 429/44

(58) Field of Search ........................... 29/623.5; 429/30, 429/40, 44

(56) References Cited

U.S. PATENT DOCUMENTS

| 3,134,697 A | 5/1964 | Niedrach et al. |
| 3,297,484 A | 1/1967 | Niedrach et al. |

(List continued on next page.)

FOREIGN PATENT DOCUMENTS

| CN | 1205803 A | 1/1999 |
| JP | 57-134586 | 8/1982 |
| JP | 61-067786 | 4/1986 |

(List continued on next page.)

*Primary Examiner*—Dah-Wei Yuan
(74) *Attorney, Agent, or Firm*—McDermott Will & Emery LLP

(57) ABSTRACT

A method for producing a membrane electrode assembly 1 for solid polymer electrolyte fuel cell, the membrane electrode assembly 1 including a solid polymer electrolyte membrane 2 comprising an ion exchange membrane, a first electrode 3 having a first catalyst layer 31, and a second electrode 4 having a second catalyst layer 41, the first electrode 3 and the second electrode 4 being disposed so as to be opposed to each other via the ion exchange membrane, the method including: applying a coating solution containing a catalyst onto a base film 101 to form a first catalyst layer 31; applying a coating solution containing an ion exchange resin dissolved or dispersed in a liquid onto the first catalyst layer 31 to form an ion exchange membrane; then applying a coating solution containing a catalyst onto the ion exchange membrane to form a second catalyst layer 41; and finally, peeling off the base film 101 from a resulting laminate. According to this method, it is possible to produce membrane electrode assembly 1 for high-performance solid polymer electrolyte fuel cell having catalyst layers each having a uniform thickness efficiently and continuously.

15 Claims, 2 Drawing Sheets

U.S. PATENT DOCUMENTS

| | | | |
|---|---|---|---|
| 5,972,054 A | 10/1999 | Yotsuyanagi et al. | |
| 6,077,621 A * | 6/2000 | Allen et al. | 429/33 |
| 6,197,147 B1 | 3/2001 | Bonsel et al. | |
| 6,344,428 B1 * | 2/2002 | Lim et al. | 502/101 |
| 6,641,862 B1 * | 11/2003 | Grot | 427/115 |
| 5,879,828 A | 3/1999 | Debe et al. | |
| 5,084,144 A | 1/1992 | Reddy et al. | |

FOREIGN PATENT DOCUMENTS

| | | |
|---|---|---|
| JP | 4-162365 | 6/1992 |
| JP | 6-44984 | 2/1994 |
| JP | 6-251779 A | 9/1994 |
| JP | 7-176317 A | 7/1995 |
| JP | 9-92303 A | 4/1997 |
| JP | 9-180740 A | 7/1997 |

* cited by examiner

METHOD FOR PRODUCING FILM ELECTRODE JOINTED PRODUCT AND METHOD FOR PRODUCING SOLID POLYMER TYPE FUEL CELL

TECHNICAL FIELD

The present invention relates to a method for producing a solid polymer electrolyte fuel cell as well as to a method for producing a membrane electrode assembly for solid polymer electrolyte fuel cell.

BACKGROUND ART

Hydrogen/oxygen fuel cells produce in principle only water as their reaction product and hence receive attention as electric power generating systems that produce little adverse effect on the Earth's environment. Among them, solid polymer electrolyte fuel cells, in particular, are greatly expected to come in practice since their power density has been raised with rapid progress of study in recent years.

Conventionally, such a solid polymer electrolyte fuel cell usually outputs power by the reaction between a fuel gas supplied to the anode side and an oxidant gas containing oxygen to the cathode side, respectively, of a membrane electrode assembly in which gas-diffusive electrodes each provided with a catalyst layer containing a catalyst and an ion exchange membrane are joined with each other. The following methods, for example, are known as membrane electrode assembly production methods.

(1) Method in which a catalyst is caused to deposit directly on an ion exchange membrane (JP-B-58-47471).
(2) Method in which gas-diffusive electrode sheets having a catalytic activity are formed and the electrode sheets are joined with an ion exchange membrane (U.S. Pat. No. 3,134,697, U.S. Pat. No. 3,297,484, and JP-B-2-7398).
(3) Method in which two sets (half cells) of an ion exchange membrane and a catalyst layer formed thereon are formed and the two sets are adhered by pressure to each other with their respective ion exchange membrane sides facing each other to form a membrane electrode assembly.

Recently, the method (2) has been mainly employed in view of its merit that a small amount of a catalyst can be utilized effectively. The following processes, for example, have been proposed as specific processes for method (2). (2-1) Electrochemical deposition process (U.S. Pat. No. 5,084,144). (2-2) Process in which a coating solution containing a catalyst is applied onto an ion exchange membrane, or process in which a catalyst layer is formed by applying a coating solution containing a catalyst onto a gas diffusion layer, that is disposed adjacently to each catalyst layer to assist the catalyst layer in ensuring the stable gas-diffusibility thereof and to function also as a current collector, to obtain a electrode and two of the electrodes and an ion exchange membrane are joined together by means of a hot press or the like (coating process, JP-A-4-162365). (2-3) Process in which a catalyst layer is formed on a separately-provided base film, the catalyst layer is laminated with an ion exchange film, and the catalyst layer is transferred to the ion exchange membrane by hot-pressing (transfer process).

Also, method (3) has been tried since it has the merit of enabling the thickness of an ion exchange membrane to be reduced (JP-A-6-44984, JP-A-7-176317, and the like).

With the prior art transfer process noted above, however, it is required that the hot-pressing transfer be performed under such a low-pressure condition as not to crush a large number of fine pores which are present in the catalyst layers in order to ensure the gas-permeability within the catalyst layers. It is, therefore, difficult to completely transfer the catalyst layers to the membrane, resulting in a low yield or a high probability that the thickness of each catalyst layer becomes non-uniform. For this reason, a problem arises that it is difficult to adjust (make uniform) the amount of the catalyst in the plane direction of the membrane electrode assembly, hence, to obtain stable cell performance.

The coating process noted above conventionally employs a process of applying mainly a coating solution onto each gas diffusion layer in order to ensure fine pores within the catalyst layer, improve the gas-permeability and prevent concentration polarization in a high current density region. However, since such a gas diffusion layer is usually composed of porous carbon paper or carbon felt, a portion of uneven surface of the gas diffusion layer sometimes bites into the ion exchange membrane when the gas diffusion layer is joined with the ion exchange membrane by means of a hot press. In this case, the thickness of the ion exchange membrane partially varies and hence becomes non-uniform, raising problems including a lowered open circuit voltage due to gas leakage, short-circuit and the like. Thus, this process has a difficulty in stably producing membrane electrode assemblies using a thin ion exchange membrane having a thickness of not more than 30 im, for example.

DISCLOSURE OF INVENTION

Accordingly, it is an object of the present invention to provide a novel production method which solves the foregoing problems of the prior art and is capable of efficiently and continuously producing a high-performance membrane electrode assembly for solid polymer electrolyte fuel cell having catalyst layers with a uniform thickness.

The present invention provides a method for producing a membrane electrode assembly for solid polymer electrolyte fuel cell, said membrane electrode assembly comprising a solid polymer electrolyte membrane composed of an ion exchange membrane, a first electrode having a first catalyst layer, and a second electrode having a second catalyst layer, said first electrode and said second electrode being disposed adjacently to said solid polymer electrolyte membrane and opposed to each other via said solid polymer electrolyte membrane, said method comprising the steps of:

a step A of applying a first coating solution containing a catalyst 1 onto a base film to form a first catalyst layer;

a step B of applying a coating solution for forming an ion exchange membrane containing an ion exchange resin dissolved or dispersed in some liquids onto said first catalyst layer to form an ion exchange membrane;

a step C of applying a second coating solution containing a catalyst 2 onto said ion exchange membrane to form a second catalyst layer; and a step D of peeling off said base film from a laminate comprising said first catalyst layer, said ion exchange membrane and said second catalyst layer formed on said base film via said steps A to C.

According to the method of the present invention, an assembly of the catalyst layers and the membrane laminated on the base film in the order of the first catalyst layer, the ion exchange membrane and the second catalyst layer is formed by the steps A to C. At the step A, it is preferable that after the application of the first coating solution containing the catalyst 1, the liquid component (the dispersing medium) is removed by drying and, then, the process proceeds to the step B. At the step B, the coating solution for forming the ion exchange membrane is applied onto the first catalyst layer, and the liquid component is evaporated off from the coating layer thus applied to form the ion exchange membrane layer that becomes the solid polymer electrolyte membrane on the first catalyst layer. At this time, the ion exchange resin contained in the coating solution for forming an ion exchange membrane impregnates fine pores of the first catalyst layer and solidifies thereby securely joining the first catalyst layer and the ion exchange membrane at their interfaces.

Though the thickness of the ion exchange membrane can be adjusted by selecting a concentration, some liquids (solvents or dispersing media) or the like of the coating solution for forming ion exchange membrane or means at the step B, the application and drying of the aforementioned coating solution may be repeatedly performed until a predetermined thickness is obtained if a thick ion exchange membrane is to be desired.

Subsequently, the second coating solution containing the catalyst 2 is applied onto the aforementioned ion exchange membrane to form the second catalyst layer at the step C and, thereafter, the process proceeds to the step D where the base film is peeled off from the aforementioned first catalyst layer. Though it is possible to perform the steps A to D continuously in the order of A, B, C and D without any other intervening step, the steps A to C preferably include respective drying steps subsequent to the applications of respective coating solutions.

If drying is not performed at the step A and the process proceeds to the subsequent step B, there is a possibility that the catalyst and ion exchange resin in the first catalyst layer are mixed with the coating solution for forming ion exchange membrane due to the influence of the solvent used in that coating solution and, hence, the components of the first catalyst layer are mixed with those of the ion exchange membrane. As a result, the interface between the first catalyst layer and the ion exchange membrane becomes indefinite, thus incurring a possibility that the thickness of the first catalyst layer and that of the ion exchange membrane may not be controlled and that the first catalyst layer and the ion exchange membrane may not exhibit their own inherent functions. Also in the case where the process proceeds to the step C without performing drying at the step B, there is a possibility that incidents similar to those described above occur between the ion exchange membrane and the second catalyst layer. If the drying is not performed at the step C and the process proceeds to the subsequent step D, it becomes difficult to peel off the base film.

BEST MODE FOR CARRYING OUT THE INVENTION

Figure 1:
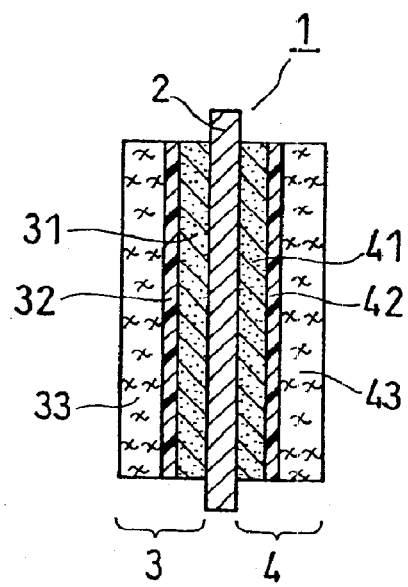
FIG. 1 is a sectional view showing a preferred embodiment of a membrane electrode assembly for solid polymer electrolyte fuel cell obtained by the production method of the present invention.

Each of the first electrode and the second electrode in the present invention may comprise a catalyst layer alone but may be constituted of a catalyst layer and a gas diffusion layer by disposing a gas diffusion layer comprising carbon cloth, carbon paper or the like adjacently to the catalyst layer. Here, the gas diffusion layer is a porous layer disposed between the gas flow path and the catalyst layer and has the function of evenly and sufficiently supplying a gas to the catalyst layer while functioning also as a current collector. In this case, a membrane electrode assembly can be formed by sandwiching an assembly of the catalyst layers and the ion exchange membrane between two sheets of such gas diffusion layers. It is noted that each catalyst layer and a respective gas diffusion layer may be bonded together by means of a hot press or the like.

Outside the membrane electrode assembly, a separator with a groove usually formed at a surface thereof that becomes a gas flow path is disposed to form a solid polymer electrolyte fuel cell. If such membrane electrode assemblies are stacked upon another via such a separator, a solid polymer electrolyte fuel cell of a stacked structure is obtained. In the case where the substantial flow path width of the gas flow path in the separator is narrow enough (from about 0.05 to 0.5 mm, for example), it is possible to diffuse and supply a gas to the catalyst layer sufficiently even in the absence of the aforementioned gas diffusion layer.

Preferably, an electrically-conductive layer comprising, for example, an electrically-conductive carbon material and a binding material is present between the gas diffusion layer and the catalyst layer. The presence of the electrically-conductive layer would make it possible to protect the catalyst layer and the ion exchange membrane from the uneven surface of the carbon cloth or the carbon paper, hence, to prevent an electrical short-circuit caused by the unevenness of the surface of the carbon cloth or the carbon paper. Further, it is possible to prevent the catalyst layer from becoming useless in the cell reaction due to the penetration of the catalyst layer into the voids of the gas diffusion layer.

The binding material used in this case preferably comprises a water-repellent polymer. When a solid polymer electrolyte fuel cell is operated, the reaction: $1/2O_2+2H^++2e^- \rightarrow H_2O$ takes place at the cathode to produce water. Usually, a wet gas is supplied to each electrode for preventing the polymer electrolyte membrane from drying in order to maintain the electrical conductivity of the membrane. For this reason, if a solid polymer electrolyte fuel cell is operated under the conditions of a low operating temperature and a high gas utilization, water vapor condenses to cause an electrode-occluding phenomenon (flooding) to occur, resulting in a possibility that the power output is lowered due to lowered gas-diffusibility when the cell is operated for a long time. Under such operating conditions, the presence of the aforementioned electrically-conductive layer makes it possible to inhibit flooding.

Usually, the aforementioned electrically-conductive layer has electrical conductivity so as not to lower the power output and is formed by treating the surface of a base for a gas diffusion layer with a liquid containing a water-repellent polymer such as PTFE and carbon black, for example. According to the method of the present invention, it is possible to form such an electrically-conductive layer in the same manner as in the case of the catalyst layer and the ion exchange membrane. Specifically, the following process can be employed.

A coating solution for forming electrically-conductive layer is applied onto the base to form a first electrically-conductive layer, then the steps A, B and C are performed in this order, and further the coating solution is applied thereonto to form a second electrically-conductive layer. Namely, an assembly can be formed by forming five layers consisting of first electrically-conductive layer/first catalyst layer/ion exchange membrane/second catalyst layer/second electrically-conductive layer on the base in this order and, then, peeling off the base from the electrically conductive layer. In this case, the procedure of the step A is performed such that the application is made not directly onto the base but onto the first electrically-conductive layer formed on the base. It is possible that such an electrically-conductive layer is formed on only one of the first catalyst layer side and the second catalyst layer side.

In the case where such an electrically-conductive layer is formed as described above, the polymer serving as the binding material is preferably a fluorine-contained polymer since it has a superior corrosion resistance as well as water repellency and, particularly, a fluorine-contained polymer substantially free of any ion exchange group that is soluble in a solvent is preferable. A water-repellent polymer such as PTFE that is insoluble in such a solvent needs to be used as dispersed in a dispersing medium in the preparation of a coating solution and, therefore, a dispersant such as a surfactant is required to disperse the polymer homogeneously. Here, the surfactant is hydrophilic and a sufficient water-repellent effect is not provided if the surfactant is present in the electrically-conductive water-repellent layer and, therefore, the aforementioned coating solution usually needs to be heat-treated at a temperature not lower than 300° C. after the application thereof to remove the dispersant. However, since an ion exchange resin used as a solid polymer electrolyte usually has a heat-resistant temperature lower than 300° C., the electrically-conductive water-repellent layer applied on the second catalyst layer cannot be heated to a temperature allowing removal of the dispersant even when it is subjected to such a heat treatment, resulting in a possibility that sufficient water repellency may not obtained.

On the other hand, the use of a fluorine-contained polymer that is soluble in a solvent does not require any dispersant for preparing the coating solution and, hence, it is sufficient to disperse carbon black, for example, as an electrically-conductive material in a solution of the fluorine-contained polymer. Accordingly, as long as the temperature of a heat treatment performed after the application of the coating solution is higher than the boiling point of the solvent in the above solution, it is possible to form an electrically-conductive layer comprising the foregoing fluorine-contained polymer and the electrically-conductive material, hence, obtain a sufficient water-repellent effect.

The aforementioned fluorine-contained polymer that is soluble in a solvent is preferably a polymer having a fluorine-contained aliphatic cyclic structure at the main chain. Such a polymer is hard to crystallize because of the twist of the molecule attributed to the molecular structure thereof and is soluble in a fluorine-contained solvent. Examples of such polymers include polymers containing a polymeric unit represented by any one of the formulae (1) to (4). In formula (1), $R^1$ is a fluorine atom or a trifluoromethyl group, a is an integer from 0 to 5, b is an integer from 0 to 4, c is 0 or 1, and a+b+c is from 1 to 6; in formula (2), d, e and f are independently an integer from 0 to 5, and d+e+f is from 1 to 6; in formula (3), $R^2$ and $R^3$ are independently a fluorine atom or a trifluoromethyl group; and in formula (4), g is 1 or 2.

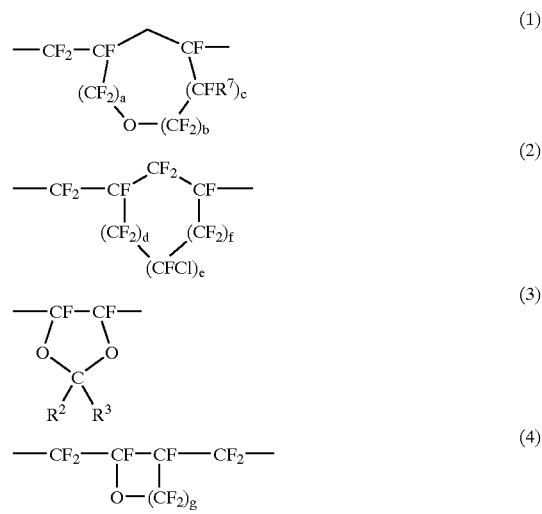

Solvents that are capable of dissolving these fluorine-contained polymers are mostly fluorine-contained solvents. Examples of such solvents include perfluorobenzene, dichloropentafluoropropane, perfluoro(2-butyltetrahydrofuran) and the like. The concentration of a solution of the aforementioned fluorine-contained polymer is preferably 0.01% to 50% by mass.

It should be noted that the aforementioned electrically-conductive layer need not have water repellency in the case where there is no possibility of flooding, such as the case where reaction gases to be supplied to the cell are dry or are not in a sufficiently wet state, the case where the cell is operated at a low current density, the case where the gas utilization is low, or the case where the operating temperature is sufficiently high.

In the present invention, the solid polymer electrolyte fuel cell is preferably constructed such that the first catalyst layer formed on the base film serves as the catalyst layer of the anode while the second catalyst layer formed on the ion exchange membrane serves as the catalyst layer of the cathode. Since the anode and cathode of a solid polymer electrolyte fuel cell are usually supplied with a gas containing hydrogen and a gas containing oxygen, respectively, it is required in obtaining a high-performance cell that the catalyst layer of the anode be excellent in gas-diffusibility with respect to hydrogen and that the cathode be excellent in gas-diffusibility with respect to oxygen.

Since the ion exchange resin constituting the ion exchange membrane impregnates the fine pores of the first catalyst layer and solidifies at the step B, the first catalyst layer is easy to become dense though having an advantage that the interface with the ion exchange membrane can be firmly joined. However, the ion exchange resin has a far higher permeability to hydrogen than to oxygen and, hence, as far as the anode is concerned, there arises no problem of lowered gas-permeability even if the catalyst layer of the anode is impregnated with the ion exchange resin and hence has a dense structure.

On the other hand, if the first catalyst layer is used as the catalyst layer of the cathode, oxygen, which has a lower permeability than hydrogen, has to pass through the catalyst layer densely filled with the ion exchange resin, so that concentration polarization is likely to take place due to the limited mass transfer rate of oxygen, resulting in a possibility that the current-voltage characteristics are deteriorated. That is, since the catalyst layer of the cathode needs to be maintained porous while the catalyst layer of the anode need not have so high a porosity as the catalyst layer of the cathode, the use of the first catalyst layer as the anode according to the production method of the present invention allows the porosity of the cathode to be maintained, thereby making it possible to provide a high-performance solid polymer electrolyte fuel cell.

The first catalyst layer and the second catalyst layer in the present invention, which contain the catalyst 1 and the catalyst 2 respectively, preferably contain an ion exchange resin in addition to the respective catalysts in order to enhance the cell characteristics of the fuel cell. Accordingly, it is preferable to use a coating solution in which a catalyst and an ion exchange resin are dispersed or dissolved as a coating solution for forming catalyst layers. The ion exchange resin used here is also capable of functioning as a binder for the catalyst layers. The ion exchange resin contained in the catalyst layers may be the same as or different from the ion exchange resin forming the ion exchange membrane. As in the case of the ion exchange membrane, the application and drying of the coating solution may be repeated to attain a predetermined thickness when the thickness of a catalyst layer is to be made larger.

In the present invention, though the catalyst 1 and the catalyst 2 contained in respective catalyst layers may be the same or different, the catalyst 1 as well as the catalyst 2 is preferably a catalyst supporting a metal catalyst composed of platinum or a platinum alloy on carbon. Carbon support preferably has a specific surface area of from 50 to 1500 $m^2/g$. Within this range, the metal catalyst is supported on the carbon support with good dispersibility and stably exhibits a superior activity in the electrode reaction for a long time. Platinum is preferable as such a metal catalyst because it is highly active with respect to the hydrogen oxidation reaction at the anode and the oxygen reduction reaction at the cathode in a solid polymer electrolyte fuel cell. In some cases, the use of a platinum alloy could make it possible to impart the electrode catalyst with further stability and activity.

The aforementioned platinum alloy is preferably an alloy comprising platinum and one or more metals selected from the group consisting of platinum group metals other than platinum (ruthenium, rhodium, palladium, osmium, iridium), gold, silver, chrome, iron, titanium, manganese, cobalt, nickel, molybdenum, tungsten, aluminum, silicon, zinc and tin, and may contain an intermetallic compound of platinum and a metal alloyed with platinum. Particularly in the case where the anode is supplied with a gas containing carbon monoxide, the use of an alloy comprising platinum and ruthenium in the anode is preferable because the activity of the catalyst is stabilized.

Though the thickness of each catalyst layer and that of the ion exchange membrane in the present invention are not particularly limited, it is preferred that the thickness of the ion exchange membrane be not more than 50 $\mu$m. If the thickness of the ion exchange membrane is more than 50 $\mu$m, the concentration gradient of the amount of water vapor in the ion exchange membrane, which is sandwiched between the anode and the cathode, is decreased so that the ion exchange membrane becomes easy to dry and, when the ion exchange membrane dries, the proton conductivity lowers, resulting in a possibility that the cell characteristics is lowered. Though the thinner ion exchange membrane is more preferable from the foregoing viewpoint, the thickness of the ion exchange membrane is preferably from 3 to 40 $\mu$m, more preferably from 5 to 30 $\mu$m since it is possible that too thin ion exchange membrane causes a short-circuit to occur.

From the viewpoint of facilitating the gas diffusion in the catalyst layers and improving the cell characteristics, the thickness of each catalyst layer is preferably not more than 20 $\mu$m, and more preferably, it is uniform. According to the production method of the present invention, it is possible to form a catalyst layer having a uniform thickness of not more than 20 $\mu$m. Though it is possible that the amount of the catalyst loading per unit area is decreased to lower the reaction activity when the catalyst layer is made thin, the use of a supported catalyst supporting platinum or a platinum alloy as the catalyst at a high supporting rate makes it possible to maintain the reaction activity of the electrodes high without any shortage of the amount of catalyst even if the catalyst layer is thin. From the foregoing viewpoint, the thickness of each catalyst layer is preferably from 1 to 15 $\mu$m.

There is no particular limitation on processes for forming the ion exchange membrane and the catalyst layers. Examples of specific processes include batch processes such as a bar coater process, a spin coater process and a screen printing process, and continuous processes such as a post-weighing process and a pre-weighing process. The post-weighting process is one in which a coating solution is applied in excess and, thereafter, the coating solution thus applied is removed to attain a predetermined thickness. The pre-weighing process is one in which the coating solution is applied in an amount required to obtain a predetermined thickness.

Such post-weighing processes include an air doctor coater process, a blade coater process, a rod coater process, a knife coater process, a squeeze coater process, a impregnate coater process, a comber coater process, and the like, while such pre-weighing processes include a die coater process, a reverse roll coater process, a transfer roll coater process, a gravure coater process, a kiss-roll coater process, a cast coater process, a spray coater process, a curtain coater process, a calender coater process, an extrusion coater process, and the like. The screen printing process and the die coater process are preferable in forming a uniform ion exchange membrane on a catalyst layer and, when the production efficiency is taken into consideration, the continuous die coater process is preferable.

Next, specific embodiments of methods for obtaining a membrane electrode assembly by the continuous die coater process will be described with reference to drawings.

FIG. 1 is a sectional view showing a preferred embodiment of a membrane electrode assembly 1 for solid polymer electrolyte fuel cell obtained by the production method of the present invention. The membrane electrode assembly 1 has a first electrode 3 and a second electrode 4 which are disposed on opposite sides of a solid polymer electrolyte membrane 2. The first electrode 3 is composed of a first catalyst layer 31, an electrically-conductive water-repellent layer 32 and a gas diffusion layer 33, while the second electrode 4 is composed of a second catalyst layer 41, an electrically-conductive water-repellent layer 42 and a gas diffusion layer 43.

Figure 2:
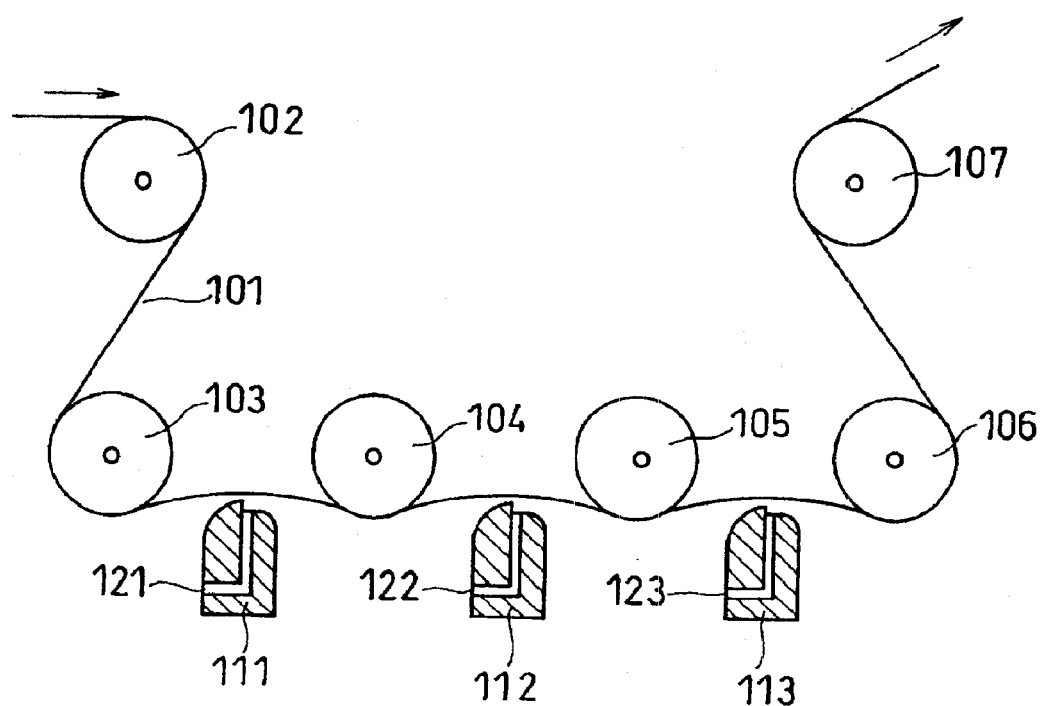
FIG. 2 is a sectional view schematically showing the construction of a first applicator for carrying out the present invention according to a die coater process.

FIG. 2 is a sectional view schematically showing the construction of a first applicator for carrying out the present invention by the die coater process. A base film 101 passes through a guide roll 102, support rolls 103, 104, 105 and 106 and a guide roll 107 and is led to a post-process, for example, a heat-treatment process to be described later. Application heads 111, 112 and 113 are disposed between the support rolls 103, 104, 105 and 106, and the application heads 111, 112 and 113 are pressed against the surface of the base film 101 to apply plural coating solutions onto the base film 101 sequentially. By adjusting the pressing force of each application head, it is possible to adjust the tension of a portion to be coated. The application heads 111, 112 and 113 are provided with the respective slits 121, 122 and 123, which are supplied with a first coating solution, a coating solution for forming an ion exchange membrane and a second coating solution, respectively.

In the case where drying is necessary after the application of the first coating solution and before the application of the coating solution for forming an ion exchange membrane, it is sufficient to install a drying device between the application head 111 and the application head 112, and the first coating solution can be dried by performing hot air drying, for example. Here, the positional relation between the foregoing drying device and the support roll 104 is not particularly limited. Likewise, in the case where drying is necessary after the application of the coating solution for forming ion exchange membrane and before the application of the second coating solution, it is sufficient to install a drying device between the application head 112 and the application head 113.

By the production using the aforementioned applicator, the first catalyst layer 31, the solid polymer electrolyte membrane 2 and the second catalyst layer 41 are stacked on the base film 101. An assembly comprising the catalyst layers and the membrane is obtained by peeling off the base film 101 from the first catalyst layer 31, and a membrane electrode assembly 1 is obtained by disposing gas diffusion layers 33 and 43 formed with respective electrically-conductive layers 32 and 42 on opposite sides of the assembly. As described earlier, the electrically-conductive layers may be formed continuously in the same manner as with the catalyst layers and the like and, in such a case, it is sufficient to install other application heads between the guide roll 102 and the support roll 103 and between the support roll 106 and the guide roll 107, respectively and to supply a coating solution for forming electrically-conductive layer from those application heads.

Figure 3:
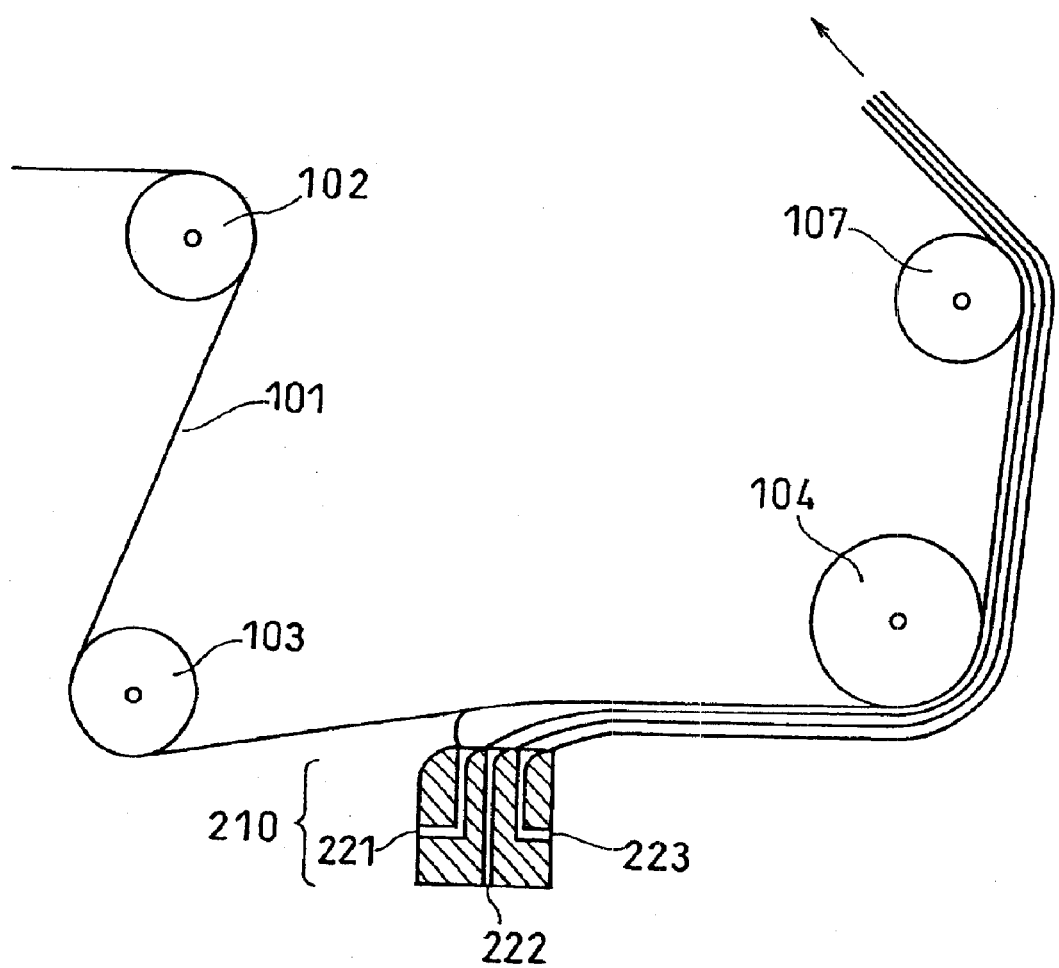
FIG. 3 is a sectional view schematically showing the construction of a second applicator for carrying out the present invention according to the die coater process.

FIG. 3 is a sectional view schematically showing the construction of a second applicator for carrying out the present invention by the die coater process. In the same manner as FIG. 2, a base film 101 passes through a guide roll 102, support rolls 103 and 104 and a guide roll 107 and is led to a post-process, for example, a heat-treatment process to be described later. An application head 210 is disposed between the support rolls 103 and 104 and is pressed against the surface of the base film 101 to apply plural coating solutions onto the base film 101, intermittently. By adjusting the pressing force, it is possible to adjust the tension of a portion to be coated. Specifically, for example, it is sufficient to fit a screw thread (not shown) to the rear side of the application head 210 and adjust the pressing force by means of this screw thread.

The application head 210 is provided with slits 221, 222 and 223, which are supplied with the first coating solution, the coating solution for forming an ion exchange membrane and the second coating solution, respectively. In the case where an electrically-conductive layer is to be formed using this applicator, it is sufficient to increase the number of slits of the application head 210 so that electrically-conductive layers are formed at the lowermost layer and/or the uppermost layer.

In the present invention, it is possible to use any one of a fluorine-contained ion exchange resin and a fluorine-free ion exchange resin as each of the ion exchange resin forming the ion exchange membrane and the ion exchange resin contained in the catalyst layers, and such an ion exchange resin may comprise either a single ion exchange resin or a mixture of two or more ion exchange resins. The ion exchange resins contained in the catalyst layers on the anode side and the cathode side may be the same or different.

From the viewpoint of durability, however, the ion exchange resin contained in the catalyst layers as well as the resin constituting the ion exchange membrane preferably comprises a perfluorocarbon polymer having a sulfonic acid group. Particularly preferable is a copolymer comprising a repeating unit based on tetrafluoroethylene and a repeating unit based on a perfluorovinyl compound having a sulfonic acid group.

The perfluorovinyl compounds are preferably those represented by $CF_2=CF(OCF_2CX)_mO_p(CF_2)_nSO_3H$, wherein X is a fluorine atom or a trifluoromethyl group, m is an integer from 0 to 3, n is an integer from 1 to 12, and p is 0 or 1, particularly preferably a compound represented by any one of the formulae 5, 6 and 7. In the formulae 5 to 7, q is an integer from 1 to 8, r is an integer from 1 to 8, and t is 2 or 3.

$$CF_2=CFO(CF_2)_qSO_3H \qquad (5)$$

$$CF_2=CFOCF_2CF(CF_3)O(CF_2)_rSO_3H \qquad (6)$$

$$CF_2=CF(OCF_2CF(CF_3))O(CF_2)_2SO_3H \qquad (7)$$

The ion-exchange capacity of the ion exchange resin constituting the ion exchange membrane and that of the ion exchange resin contained in the catalyst layers are each preferably from 0.5 to 4.0 meq/g dry resin, particularly preferably from 0.7 to 2.0 meq/g dry resin. If the ion-exchange capacity is too low, the ion conductivity of the ion exchange membrane and that of the catalyst layers are lowered.

If the ion-exchange capacity is too high, on the other hand, the strength of the ion exchange membrane is weakened, while the moisture content of the catalyst layers becomes high. When the moisture content of the catalyst layers becomes high, water produced by the reaction of the cell and water fed together with a fuel gas to promote the reaction are difficult to discharge to the outside of the catalyst layers and, hence, it is possible that such water is stored within the catalyst layers. As a result, a flooding phenomenon is possible to occur that fine pores of the catalyst layers are occluded with water and, hence, the supply of fuel gas to the catalyst layers becomes difficult, causing the voltage of generated power to lower.

The solvent contained in the coating solution for forming an ion exchange membrane is required to be capable of dissolving or favorably dispersing the ion exchange resin and, hence, preferable solvents differ from ion exchange resins. This holds true for the coating solution for forming a catalyst layer if an ion exchange resin is contained in the catalyst layers. The solvent may be either a single solvent or a mixed solvent of two or more solvents. However, a low-boiling-point solvent having a boiling point of not higher than 50° C. is not preferable because the composition of a coating solution varies due to evaporation of the low-boiling-point solvent before or at the time of the application of the coating solution, making it difficult to control the thickness of a coating layer.

In the case where a coating solution contains a perfluorocarbon polymer having a sulfonic acid group, alcohols or fluorine-contained solvents are preferably used. The followings are exemplified in concrete.

Such alcohols are preferably alcohols each having 1 to 4 carbon atoms in the main chain thereof; for example, methyl alcohol, ethyl alcohol, n-propyl alcohol, isopropyl alcohol, tert-butyl alcohol and the like are usable. Mixing an alcohol with water makes it possible to enhance the solubility of an ion exchange resin.

The following solvents can be mentioned as examples of fluorine-contained solvents.

Hydrofluorocarbons such as 2H-perfluoropropane, 1H,4H-perfluorobutane, 2H,3H-perfluoropentane, 3H,4H-perfluoro(2-methylpentane), 2H,5H-perfluorohexane, and 3H-perfluoro(2-methylpentane).

Fluorocarbons such as perfluoro(1,2-dimethylcyclobutane), perfluorooctane, perfluoroheptane, and perfluorohexane.

Hydrochlorofluorocarbons such as 1,1-dichloro-1-fluoroethane, 1,1,1-trifluoro-2,2-dichloroethane, 3,3-dichloro-1,1,1,2,2-pentafluoropropane, and 1,3-dichloro-1,1,2,2,3-pentafluoropropane.

Fluoroethers such as 1H,4H,4H-perfluoro(3-oxapentane) and 3-methoxy-1,1,1,2,3,3-hexafluoropropane.

Fluorine-contained alcohols such as 2,2,2-trifluoroethanol, 2,2,3,3,3-pentafluoro-1-propanol, and 1,1,1,3,3,3-hexafluoro-2-propanol.

In the case where a coating solution contains a fluorine-free ion exchange resin, N,N-dimethylformamide (DMF), dimethyl sulfoxide (DMSO), methylene chloride, chloroform, carbon tetrachloride, 1,1,1-trichloroethane, 1,1,2-trichloroethane, trichloroethylene, and tetrachloroethylene may be used.

The solid content concentration of the first coating solution, the solid content concentration of the coating solution for forming an ion exchange membrane and the solid content concentration of the second coating solution each can be appropriately selected according to the thickness of an intended catalyst layer or the thickness of an intended ion exchange membrane and are not particularly limited but are preferably from 1% to 50% by mass each, particularly from 5% to 35% by mass each. If the solid content concentration is too low, there is a possibility that a crack is developed when a coating layer is dried. If the solid content concentration is too high, on the other hand, the coating solution has a high viscosity and, hence, there is a possibility that uniform application thereof cannot be achieved.

In the present invention, the base film has a role of maintaining the shape of each catalyst layer and needs to be insoluble in the first coating solution and to be unmeltable during drying of each coating solution. Specifically, films respectively comprising the following materials are preferably used.

Fluorine-free polymers such as polyethylene terephthalate (hereinafter referred to as PET), polyethylene, polypropylene (hereinafter referred to as PP), and polyimide. Fluoropolymers such as polytetrafluoroethylene, ethylene/tetrafluoroethylene copolymer, ethylene/hexafluoropropylene copolymer, tetrafluoroethylene/perfluoro(alkyl vinyl ether) copolymer, and polyvinylidene fluoride.

Since the base film is peeled off from the first catalyst layer at the step D, it is required that the base film be moderately easy to be peeled off from the first catalyst layer. When this point is taken into consideration, the base film preferably comprises a fluoropolymer. If a film comprising a fluorine-free polymer is used, the use of such a film that is surface-treated with a silicone-type parting agent, a fluorine-type parting agent or the like is preferable; for example, PET surface-treated with a parting agent can be used preferably.

In the present invention, it is preferred that a heat treatment be performed after the formation of the second catalyst layer (after the completion of the step C) in order to improve the adhesion strength between the first catalyst layer on the base film and the ion exchange membrane and between the second catalyst layer and the ion exchange membrane, to enhance the strength of the ion exchange membrane itself and the strength of the resin itself contained in the catalyst layers, and further to enhance the bond strength of the membrane electrode assembly. Specifically, for example, any one of the following three heat treatment processes may be performed.

1) An oven heating process in which a laminate comprising the first catalyst layer, the ion exchange membrane and the second catalyst layer which are formed on the base film is heated in an oven at a temperature not lower than the softening temperature of the ion exchange membrane.

2) A hot pressing process in which the foregoing laminate is bonded by means of a hot press at a temperature not lower than the softening temperature of the ion exchange membrane.

3) A hot rolling process in which the foregoing laminate is bonded by means of a hot roll at a temperature not lower than the softening temperature of the ion exchange membrane.

To produce membrane electrode assemblies with good production efficiency, it is preferred that the heat treatment process be performed continuously, and in this respect, it is preferred that the oven heating process be performed not in a batch manner but in a continuous manner or that the hot rolling process be performed. The oven heating process can be carried out by keeping the laminate formed on the base film in an oven heated to a temperature not lower than the softening temperature of the ion exchange membrane for a predetermined time period. The temperature to which the oven is heated at this time is preferably from 100 to 200° C., particularly from 120 to 180° C. The keeping time is preferably from 3 minutes to 2 hours, particularly from 10 minutes to one hour. If the keeping time is too long or the temperature is too high, there is the possibility that the proton conductivity of the ion exchange resin contained in the catalyst layers or that of the ion exchange membrane lowers. On the other hand, if the keeping time is too short or the temperature is too low, there is the possibility that the adhesion strength is not sufficiently enhanced or the strength of the ion exchange membrane is not enhanced.

The hot rolling process can be carried out by, for example, passing the laminate between heated rolls. At this time, the roll temperature is preferably from 50 to 200° C., particularly from 100 to 180° C. The linear pressure between the rolls is preferably from 5 to 100 kg/cm$^2$. If the temperature is too high, there is the possibility that the ion exchange resin contained in the catalyst layers or the ion exchange membrane melts, while if the temperature is too low, the bond strength between the ion exchange membrane and the catalyst layers is difficult to enhance. If the linear pressure between the rolls is too high, it is possible that fine pores within the catalyst layers are crushed, while if it is too low, the adhesion strength between the catalyst layers and the ion exchange membrane is difficult to enhance.

The foregoing heat treatment is preferably preformed under environment which is isolated from oxygen. If the heat treatment is performed in an atmosphere where oxygen is present, there is the possibility that a part of the ion exchange resin contained in the catalyst layers or the resin forming the ion exchange resin denatures due to the oxidation reaction and the power output consequently lowered.

Here, methods for heat-treating the aforementioned laminate by isolating oxygen include a method in which the laminate is heat-treated in an inert gas atmosphere such as nitrogen gas or argon gas, a method in which the laminate is heat-treated in vacuum, a method in which gas-impermeable films are adhered tightly on opposite sides of the laminate and then the laminate is heat-treated, and the like. What is referred to as "gas-impermeable film" here is a film having a gas permeability constant of not more than about $2 \times 10^{-10} m^3 \cdot m/m^2 \cdot s \cdot MPa$ for example. The gas-impermeable film may be one having a larger area than the membrane electrode assembly and substantially capable of sufficiently reducing the amount of oxygen in air contacting the aforementioned laminate. It is possible to use as materials which are exemplified for the base film. Accordingly, in the case where the heat treatment is performed after the completion of the step C and before the step D, a gas-impermeably film may be adhered tightly to the base film-free side of the laminate (the upper surface of the layer applied last) and then the heat treatment may be performed.

Next, the present invention will be described specifically by way of examples (Examples 1 to 4, 6 and 7) and a comparative example (Example 5), which do not limit the present invention.

EXAMPLE 1

As a first coating solution for forming anode catalyst layer, a liquid having a solid content concentration of 10% by mass was prepared by mixing a copolymer (ion exchange capacity: 1.1 meq/g dry resin, hereinafter referred to as copolymer A) comprising a repeating unit based on $CF_2=CF_2$ and a repeating unit based on $CF_2=CFOCF_2CF(CF_3)OCF_2CF_2SO_3H$ and a platinum/ruthenium alloy (platinum:ruthenium=4:6 in mass ratio) supported carbon (carbon:alloy=1:1 in mass ratio) at a mass ratio of 5:9 homogeneously with ethanol. This first coating solution was applied onto a PET film surface-treated with a silicone-type parting agent by a die coater process and then dried at 80° C. to form a first catalyst layer having a thickness of 10 μm and a platinum/ruthenium loading amount of 0.29 mg/cm².

Onto the first catalyst layer was applied a coating solution (coating solution for forming an ion exchange membrane) comprising 14% by mass of the copolymer A and ethanol as a solvent by the die coater process, followed by drying with an oven at 80° C. for 10 minutes to form an ion exchange membrane having a thickness of 30 μm. Further, onto the ion exchange membrane was applied a second coating solution for forming a cathode catalyst layer having a solid content concentration of 13.7% by mass and comprising the copolymer A and a platinum-supported carbon (platinum:carbon=1:1 in mass ratio) at a mass ratio of 1:2 and ethanol as a solvent by the die coater process, followed by drying to form a second catalyst layer having a thickness of 10 μm and a platinum loading amount of 0.23 mg/cm². After this laminate was cut to 7 cm square, the PET film was peeled off from the first catalyst layer to obtain an assembly of the catalyst layers and electrode.

Two frame-shaped polyimide films each having a thickness of 20 μm and an outer size of 5.6 cm×7 cm with a central cutout of 5 cm square were provided, and the foregoing assembly was sandwiched between the two films so as to position in a central portion and bonded with the films using a silicone-type adhesive.

Two sheets of carbon paper each having a thickness of about 300 μm, in which an electrically-conductive layer having a thickness of about 10 im comprising carbon black (commercial name: VULCAN XC-72, produced by Cabot Co.) and PTFE particles was formed at a surface thereof, were provided and used as gas diffusion layers. The aforementioned assembly was sandwiched between these gas diffusion layers to obtain a membrane electrode assembly. At this time, the electrically-conductive layers were positioned to contact respective electrodes. The membrane electrode assembly thus obtained was incorporated into a cell for measuring cell performance in such a manner that the first catalyst layer and the second catalyst layer became the anode and the cathode, respectively, to give a solid polymer electrolyte fuel cell having an effective electrode area of 25 cm². An electric power generating test of this cell was conducted at a cell temperature of 80° C. by supplying hydrogen gas and air to the anode and the cathode, respectively. The cell voltage at each value of current density resulting at this time is shown in Table 1. It should be noted that the unit of each value in Table 1 is mV.

EXAMPLE 2

A membrane electrode assembly was obtained in the same manner as in Example 1 except that the coating solution for forming an ion exchange membrane was applied by the die coater process and the thickness of an ion exchange membrane was made 15 μm. The membrane electrode assembly thus obtained was incorporated into a cell for measuring cell performance in the same manner as in Example 1, and a test was conducted in the same manner as in Example 1. The results are shown in Table 1.

EXAMPLE 3

A membrane electrode assembly was obtained in the same manner as in Example 2 except that the coating solution for forming an ion exchange membrane was applied once by the die coater process, followed by drying naturally for 10 minutes, the coating solution for forming an ion exchange membrane was applied again thereover, followed by drying with an oven, and the thickness of an ion exchange membrane was made 30 μm by such a two-time application. The membrane electrode assembly thus obtained was incorporated into a cell for measuring cell performance in the same manner as in Example 1, and a test was conducted in the same manner as in Example 1. The results are shown in Table 1.

EXAMPLE 4

After the formation of a first catalyst layer, an ion exchange membrane and a second catalyst layer on a PET film in the same manner as in Example 1, the resulting laminate was heat-treated with an oven at 120° C. for 30 minutes and then the PET film was peeled off from the first catalyst layer. A membrane electrode assembly was obtained in the same manner as in Example 1 except that this heat treatment procedure was performed, and this assembly was incorporated into a cell for measuring cell performance to conduct a test in the same manner as in Example 1. The results are shown in Table 1.

EXAMPLE 5

Comparative Example

The first coating solution was applied onto one side of a base comprising a 50 μm-thick PP film by the die coater process so that the adhered platinum/ruthenium amount was 0.29 mg/cm², followed by drying to form a first catalyst layer. Similarly, a second catalyst layer was formed with the use of the second coating solution by applying the second coating solution onto one side of a base comprising a 50 μm-thick PP film that was separate from the aforementioned PP film by the die coater process so that the adhered platinum/ruthenium amount was 0.23 mg/cm$^2$ and then drying the solution applied.

The two sheets thus obtained were opposed to each other so that their surfaces formed with the respective catalyst layers faced inward, and an ion exchange membrane comprising a sulfonic acid-type perfluorocarbon polymer (commercial name: FLEMION HR, produced by Asahi Glass Co. Ltd., ion exchange capacity: 1.1 meq/g dry resin, dry thickness: 30 im) as a solid polymer electrolyte membrane was sandwiched between the sheets, followed by hot pressing. The hot pressing conditions were set to 130° C., 3 MPa and 4 minutes, and after the hot pressing, the base sheets on the anode side and the cathode side were peeled off from respective catalyst layers to transfer the catalyst layers to the membrane, thus obtaining an assembly comprising the catalyst layers and the membrane.

A membrane electrode assembly was formed in the same manner as in Example 1 except that the aforementioned assembly was used as an assembly comprising catalyst layers and a membrane, and this assembly was incorporated into a cell for measuring cell performance to conduct a test in the same manner as in Example 1. The results are shown in Table 1.

EXAMPLE 6

After the formation of a first catalyst layer, an ion exchange membrane and a second catalyst layer on a PET film, the resulting laminate was placed in an oven, and a heat treatment was performed at 120° C. for 30 minutes after the inside of the oven was evacuated and then charged with nitrogen gas. Then, the PET film was peeled off from the first catalyst layer. A membrane electrode assembly was obtained in the same manner as in Example 1 except that this heat treatment procedure was performed, and this assembly was incorporated into a cell for measuring cell performance to conduct a test in the same manner as in Example 1. The results are shown in Table 1.

EXAMPLE 7

A polymer (molecular weight: about 100,000) comprising a polymeric unit based on perfluoro(3-butenyl vinyl ether) was dissolved in a mixed solvent (mass ratio=1:1) of perfluoro(2-butyltetrahydrofuran) and perfluoro(tributylamine) so that the concentration of the solute was 1.7% of the total mass of the solution. This solution was mixed with carbon black (commercial name: VULCAN XC-72, produced by Cabot Co.) so that the mass ratio between the aforementioned polymer and carbon black was 3:7, followed by sufficient stirring to obtain slurry.

The above slurry was applied onto a PET film identical with that used in Example 1 by the die coater process and then dried at 120° C. to form an electrically-conductive layer having a thickness of 10 μm. Onto this electrically-conductive layer were formed a first catalyst layer, an ion exchange membrane and a second catalyst layer in the same manner as in Example 1. Further, the aforementioned slurry was again applied onto the second catalyst layer by the die coater process and then dried at 120° C. to form an electrically-conductive layer having a thickness of 10 μm. In turn, by peeling off the PET film from the electrically-conductive water-repellent layer formed first, an assembly having a five-layered structure comprising electrically-conductive layer/first catalyst layer/ion exchange membrane/second catalyst layer/electrically-conductive layer was obtained.

Two frame-shaped polyimide films each having a thickness of 20 μm and an outer size of 5.6 cm×7 cm with a central cutout of 5 cm square were provided, and the foregoing assembly was sandwiched between the two films so as to position in a central portion and bonded with the films using a silicone-type adhesive. Subsequently, two sheets of carbon paper each having a thickness of about 300 μm were provided as gas diffusion layers, and the aforementioned assembly was sandwiched between these gas diffusion layers to obtain a membrane electrode assembly. At this time, the electrically-conductive layers were positioned to contact respective electrodes. The membrane electrode assembly thus obtained was incorporated into a cell for measuring cell performance so that the first catalyst layer and the second catalyst layer became the anode and the cathode, respectively to conduct a test in the same manner as in Example 1. The results are shown in Table 1.

TABLE 1

|  | Current Density (A/cm$^2$) | | |
| --- | --- | --- | --- |
|  | 0 | 0.2 | 0.7 |
| Example 1 | 960 | 752 | 582 |
| Example 2 | 939 | 765 | 644 |
| Example 3 | 953 | 754 | 593 |
| Example 4 | 953 | 721 | 565 |
| Example 5 | 940 | 740 | 580 |
| Example 6 | 925 | 754 | 602 |
| Example 7 | 958 | 745 | 581 |

INDUSTRIAL APPLICABILITY

According to the present invention, it is possible to produce three layers comprising a first catalyst layer, an ion exchange membrane and a second catalyst layer easily, efficiently and continuously by sequentially repeating application and drying of coating solutions. Further, since the present invention makes it possible to produce the catalyst layers so that each layer has a uniform thickness even if it is thin as well as to enhance the bond strength between the catalyst layers and the ion exchange membrane, particularly between the first catalyst layer and the ion exchange membrane, the present invention is capable of providing a high-performance solid polymer electrolyte fuel cell comprising a membrane electrode assembly that is excellent in gas-diffusibility and capable of maintaining a high power output stably.

What is claimed is:

1. A method for producing a membrane electrode assembly for solid polymer electrolyte fuel cell, said membrane electrode assembly comprising a solid polymer electrolyte membrane composed of an ion exchange membrane, a first electrode having a first catalyst layer, and a second electrode having a second catalyst layer, said first electrode and said second electrode being disposed adjacently to said solid polymer electrolyte membrane and opposed to each other via said solid polymer electrolyte membrane, said method comprising the steps of:

a step A of applying a first coating solution containing a catalyst 1 onto a base film to form a first catalyst layer;

a step B of applying a coating solution for forming an ion exchange membrane containing an ion exchange resin dissolved or dispersed in a liquid onto said first catalyst layer to form an ion exchange membrane;

a step C of applying a second coating solution containing a catalyst 2 onto said ion exchange membrane to form a second catalyst layer; and a step D of peeling off said base film from a laminate comprising said first catalyst layer, said ion exchange membrane and said second catalyst layer formed on said base film via said steps A to C.

2. The method for producing a membrane electrode assembly in accordance with claim 1, wherein each of said step A, said step B and said step C includes a procedure of drying a respective coating solution after the application thereof to remove a liquid component contained in said coating solution, said step A, said step B and said step C are performed continuously in that order.

3. The method for producing a membrane electrode assembly in accordance with claim 1 or 2, wherein: a coating solution containing an electrically-conductive carbon material and a binding material is applied onto said base film to form a first electrically-conductive layer prior to said step A; said first coating solution is applied onto said first electrically-conductive layer at said step A; and after said step C, a coating solution containing an electrically-conductive carbon material and a binding material is applied onto said second catalyst layer to form a second electrically-conductive layer.

4. The method for producing a membrane electrode assembly in accordance with claim 3, wherein said binding material is a fluorine-contained polymer which is soluble in a solvent substantially free of an ion exchange group.

5. The method for producing a membrane electrode assembly in accordance with any one of claim 1 or 2, wherein said ion exchange resin contained in said coating solution for forming an ion exchange membrane comprises a perfluorocarbon polymer having a sulfonic acid group.

6. The method for producing a membrane electrode assembly in accordance with any one of claim 1 or 2, wherein each of said catalyst 1 and said catalyst 2 is a support catalyst supporting a metal catalyst on carbon, said metal catalyst being composed of platinum or a platinum alloy, and said first coating solution and said second coating solution contain a perfluorocarbon polymer having a sulfonic acid group.

7. The method for producing a membrane electrode assembly in accordance with any one of claim 1 or 2, wherein each of said first catalyst layer and said second catalyst layer is formed to have a thickness of not more than 20 $\mu$m, and said ion exchange membrane is formed to have a thickness of from 3 to 40 $\mu$m.

8. The method for producing a membrane electrode assembly in accordance with any one of claim 1 or 2, wherein after said step C, the resulting laminate is subjected to a heat treatment.

9. The method for producing a membrane electrode assembly in accordance with claim 8, wherein said heat treatment is performed in an atmosphere isolated from oxygen.

10. The method for producing a membrane electrode assembly in accordance with any one of claim 1 or 2, wherein said first electrode is used as an anode, and said second electrode is used as a cathode.

11. A method for producing a solid polymer electrolyte fuel cell comprising a membrane electrode assembly, said membrane electrode assembly comprising a solid polymer electrolyte membrane composed of an ion exchange membrane, a first electrode having a first catalyst layer, and a second electrode having a second catalyst layer, said first electrode and said second electrode being disposed adjacently to said solid polymer electrolyte membrane and opposed to each other via said solid polymer electrolyte membrane, said method comprising the steps of:

a step A of applying a first coating solution containing a catalyst 1 onto a base film to form a first catalyst layer;

a step B of applying a coating solution for forming an ion exchange membrane containing an ion exchange resin dissolved or dispersed in a liquid onto said first catalyst layer to form an ion exchange membrane;

a step C of applying a second coating solution containing a catalyst 2 onto said ion exchange membrane to form a second catalyst layer; and a step D of peeling off said base film from a laminate comprising said first catalyst layer, said ion exchange membrane and said second catalyst layer formed on said base film via said steps A to C.

12. The method for producing a solid polymer electrolyte fuel cell in accordance with claim 11, wherein each of said catalyst 1 and said catalyst 2 is a support catalyst supporting a metal catalyst on carbon, said metal catalyst being composed of platinum or a platinum alloy, and said coating solution for forming ion exchange membrane, said first coating solution and said second coating solution contain a perfluorocarbon polymer having a sulfonic acid group.

13. The method for producing a solid polymer electrolyte fuel cell in accordance with claim 11 or 12, wherein: a coating solution containing an electrically-conductive carbon material and a binding material is applied onto said base film to form a first electrically-conductive layer prior to said step A; said first coating solution is applied onto said first electrically-conductive layer at said step A; and after said step C, a coating solution containing an electrically-conductive carbon material and a binding material is applied onto said second catalyst layer to form a second electrically-conductive layer.

14. The method for producing a solid polymer electrolyte fuel cell in accordance with any one of claim 11 or 12, wherein after said step C, the resulting laminate is subjected to a heat treatment.

15. The method for producing a solid polymer electrolyte fuel cell in-accordance with any one of claim 11 or 12, wherein said first electrode is used as an anode, and said second electrode is used as a cathode.

* * * * *